(12) United States Patent
Koeda et al.

(10) Patent No.: US 7,324,153 B2
(45) Date of Patent: Jan. 29, 2008

(54) DIGITAL CAMERA AND POWER SUPPLY CONTROL THEREOF

(75) Inventors: Akihiko Koeda, Saitama-ken (JP); Michihiro Miyake, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 756 days.

(21) Appl. No.: 10/640,519

(22) Filed: Aug. 14, 2003

(65) Prior Publication Data
US 2004/0032522 A1 Feb. 19, 2004

(30) Foreign Application Priority Data
Aug. 15, 2002 (JP) ............................. 2002-236785

(51) Int. Cl.
H04N 5/225 (2006.01)
H04N 5/222 (2006.01)
(52) U.S. Cl. ................................. 348/372; 348/333.01
(58) Field of Classification Search .....................
348/333.01–333.13, 341, 372, 366, 234–238; 345/102; 396/373–374
See application file for complete search history.

(56) References Cited
U.S. PATENT DOCUMENTS 5,406,305 A * 4/1995 Shimomura et al. ........ 345/102
5,699,115 A * 12/1997 Hiraki et al. ........... 348/333.13
5,952,992 A * 9/1999 Helms ......................... 345/102
6,226,455 B1 * 5/2001 Ishimoto et al. ............... 396/2
2001/0017661 A1 * 8/2001 Shono ......................... 348/341
2002/0109664 A1 8/2002 Shimada
2003/0122810 A1 * 7/2003 Tsirkel et al. ............... 345/207

FOREIGN PATENT DOCUMENTS

| JP | 03-009320 | 1/1991 |
|---|---|---|
| JP | 2000-010068 | 1/2000 |
| JP | 2000-101878 | 4/2000 |
| JP | 2000-305537 | 11/2000 |
| JP | 2001-086393 | 3/2001 |

\* cited by examiner

Primary Examiner—Lin Ye
Assistant Examiner—Justin P Misleh
(74) Attorney, Agent, or Firm—Sughrue Mion, Pllc.

(57) ABSTRACT

A digital camera, in which power supply to a display screen constituted by an LCD is ON/OFF-controlled, is disclosed. When drive power is supplied to the LCD, an object image is displayed on the LCD based on image data obtained by image pickup, and the LCD is used as a viewfinder in photographing. At this time, when a period, in which the level of the brightness of the object image expressed by a luminance signal of the image data is less than a predetermined level, continues for a predetermined period or longer, the supply of the drive power to a display system including the LCD is controlled to stop the supply of the drive power and save power consumption.

15 Claims, 4 Drawing Sheets

FIG. 4

DIGITAL CAMERA AND POWER SUPPLY CONTROL THEREOF

CROSS-REFERENCE TO RELATED APPLICATION

This application claims priority under 35 USC 119 from Japanese Patent Application No. 2002-236785, the disclosure of which is incorporated by reference herein.

BACKGROUND OF THE INVENTION

1. Field of the Invention

The present invention relates to a digital camera having a display screen (means) such as a liquid crystal display which can acquires, by image pickup, i.e., photography, image information expressing an object image and which can display the object image expressed by the image information.

2. Description of the Related Art

In recent years, digital cameras each having a display screen such as a liquid crystal display which can be used as a viewfinder by acquiring image information expressing an object image by image pickup and by displaying the object image expressed by the image information in real time have been commercialized in large numbers.

Since a digital camera of this type is also used at night or at dark places, an illumination device for illuminating a display screen is frequently provided to improve visibility of an image displayed on the display screen.

However, in a case in which the surroundings are sufficiently bright, sufficient illumination can be obtained even without using the illumination device. Thus, when the illumination device is used in this case, power is wasted consumed.

In order to solve this problem, the following technique (Japanese Patent Application Laid-Open (JP-A) Nos. 2000-101878, 2000-305537, and the like) is known. That is, providing the illumination device for illuminating the display screen, the illumination device is used in only dark surroundings, so that the visibility when the camera is used at the dark place is improved, and power consumption when the camera is used in a non-dark place is reduced.

However, according to this technology, when a display screen is used as a viewfinder, an object which is relatively dark has low visibility even if the display screen is illuminated, and the display screen cannot be practically used due to the darkness of the object. In this case, with this technology, although the display screen cannot be used as a viewfinder, a power required by an illumination device or the display screen to display an object image is wastefully consumed.

SUMMARY OF THE INVENTION

The present invention has been made to solve the above problem, and an object thereof is to provide a digital camera which can reduce power consumption.

In order to achieve the above object, a first aspect of the invention provides a digital camera comprising: an imaging device (image-pickup device) for generating image data, which expresses an object image, by picking up (photographing) an image of an object; a display unit for displaying the object image, wherein the display unit is driven by power being supplied such that the object image can be displayed based on the image data; a controller for controlling the supply of power to the display unit based on a brightness of the object at a timing of photographing.

In the digital camera according to the first aspect of the invention, information expressing the brightness of the object is generated, and the controller controls such that the power supply to the display unit is stopped when a period, in which a brightness expressed by the information is less than a predetermined value, continues for at least a predetermined period.

According to the first aspect of the invention, image data (image information) expressing an object image is acquired by image pickup by the imaging device, and the object image expressed by the image data is displayed on the display unit (display means) while drive power is supplied to the display unit. The imaging device includes a solid-state imaging device such as a CCD (Charge Coupled Device) or a CMOS (Complementary Metal-Oxide Semiconductor) image sensor. The display unit includes a display unit such as a liquid crystal display, an organic electroluminescent display, or a plasma display.

In the first aspect of the invention, the controller acquires brightness information expressing the brightness of the object image, and the drive power is supplied to the display unit, and the supply of the drive power to the display unit is stopped when the period, in which the level of the brightness expressed by the brightness information is lower than the predetermined level, continues for at least a predetermined period. When the level of the brightness expressed by the brightness information is lower than the predetermined level, the predetermined level is a level at which the visibility of an object image displayed on the display unit can be regarded as unpractical. For example, the level can be statistically obtained by sensory analysis by a plurality of people (for example, the level corresponding to a level at which it is determined by a majority of the people that the visibility of the displayed object image has a practical problem).

More specifically, in the invention, when the period in which the level of the brightness of the object image is lower than the predetermined level continues for at least the predetermined period, it is regarded that the state of the object image cannot be easily checked by the display unit, and power supply to the display unit is stopped. In this manner, unnecessary power consumption in the display unit can be prevented from occurring.

The reason why the predetermined period is set in the invention is as follows. That is, when the brightness expressed by the brightness information goes up and down with respect to the predetermined level for a short period (for example, a case in which a fixed object is hidden behind a moving autotruck or a moving train, a case in which a moving object is hidden behind a stopped autotruck or a stopped train, or the like), stoppage of power supply to the display unit is prevented. Therefore, it is preferable that the predetermined period is can be appropriately changed depending on the state of an object, a photographing environment, or the like.

As described above, according to the first aspect of the invention, when the drive power is supplied to the display unit, and when the period in which the level of the brightness of the object image is lower than the predetermined level continues for the predetermined period, the drive power to the display unit is stopped. For this reason, unnecessary power consumption in the display unit can be prevented from occurring. As a result, the power consumption can be reduced.

The brightness information may be a luminance signal generated on the basis of image data expressing an object image acquired by image pickup performed by the imaging device according to the invention, or may be an output signal from a photometric device (photodiode, phototransistor, or the like) for measuring the brightness of the object image.

In one embodiment of the invention, after the supply of the drive power to the display unit is stopped by the controller, when the level of the brightness of the object expressed by the brightness information is not lower than the predetermined level, the supply of the drive power to the display unit is restarted.

More specifically, in the first aspect of the invention, after the level of the brightness expressed by the brightness information is lower than the predetermined level to stop the supply of the drive power to the display unit, when the level of the brightness returns to the predetermined level or higher, the supply of the power to the display unit may be restarted. In this manner, display of the object image by the display unit is automatically restarted. Therefore, when the level of the brightness expressed by the brightness information is not lower than the predetermined level, the object image always can be displayed by the display unit, and the display unit can be effectively used.

With the above configuration, after the supply of the drive power to the display unit is stopped, when the level of the brightness expressed by the brightness information is not lower than the predetermined level, the supply of the drive power to the display unit is restarted, and the display unit can be effectively used.

When a period in which the level of the brightness expressed by the brightness information is lower than the predetermined level continues for at least the predetermined period, the supply of the drive power to the display unit is automatically stopped. Since a user refers to the object image which has been displayed on the display unit, the user may be confused. On the other hand, there are numerous cases in which optical viewfinders which do not require drive power are provided in digital cameras. In these cases, when an object image cannot be displayed on the display unit for some reason, the optical viewfinder is used.

Another embodiment of the invention provides a digital camera including an optical viewfinder through which an object image can be visually checked, wherein it is clearly indicated to urge a user to use the optical viewfinder when supply of drive power to a display unit is stopped by a controller.

More specifically, the digital camera according to this aspect includes an optical viewfinder through which an object image can be visually checked, and, when the supply of the drive power to the display unit is stopped by the controller, the display unit may clearly indicate to urge a user to use the optical viewfinder.

Therefore, even though the supply of the drive power to the display unit is stopped to stop the display of the object image by the display unit, the user can visually check the object image with the optical viewfinder without any confusion.

The clear indication includes sounding a buzzer, generating a voice guidance, turning on or flickering an LED, or the like.

The clear indication can also be achieved by a configuration in which a message urging a user to use the optical viewfinder is displayed on the display unit.

This configuration is considerably effective when a state of the object image displayed on the display unit is checked by the user.

The message is not limited to the configuration in which the message is displayed on the display unit. The message may also be displayed such that another display device or the like which can display the message is arranged.

A second aspect of the invention provides a power supply control method for use with a digital camera, which includes a display unit and can display on the display unit an image of an object to be picked up (i.e., photographed) by supplying power to the display unit, the method comprising the steps of: determining a brightness of the object at a time of photographing; and controlling power supply to the display unit based on a result of the determination, to reduce power consumption in the display unit.

The method according to the second aspect of the invention may further comprise the step of generating information expressing the brightness of the object, wherein the step of controlling power supply controls such that the power supply to the display unit is stopped when a period, in which a brightness expressed by the information is less than a predetermined value, continues for at least a predetermined period.

Furthermore, in the second aspect, the step of controlling the power supply may include the sub steps of: monitoring the information expressing the brightness after the power supply to the display unit is stopped; and restarting the power supply to the display unit when the information expressing the brightness returns to a value, which is not less than the predetermined value.

In addition, in the second aspect, the step of controlling the power supply may include the sub steps of: monitoring the information expressing the brightness after the power supply to the display unit is stopped; and restarting the power supply to the display unit when the information expressing the brightness has returned to a value, which is not less than the predetermined value, and the period, in which the information is not less than the predetermined value, continues for another predetermined period.

DETAILED DESCRIPTION OF THE INVENTION

An embodiment of the present invention will be described below in detail with reference to the accompanying drawings. An outward configuration of a digital camera 10 according to the present embodiment will be explained with reference to FIG. 1.

Figure 1:
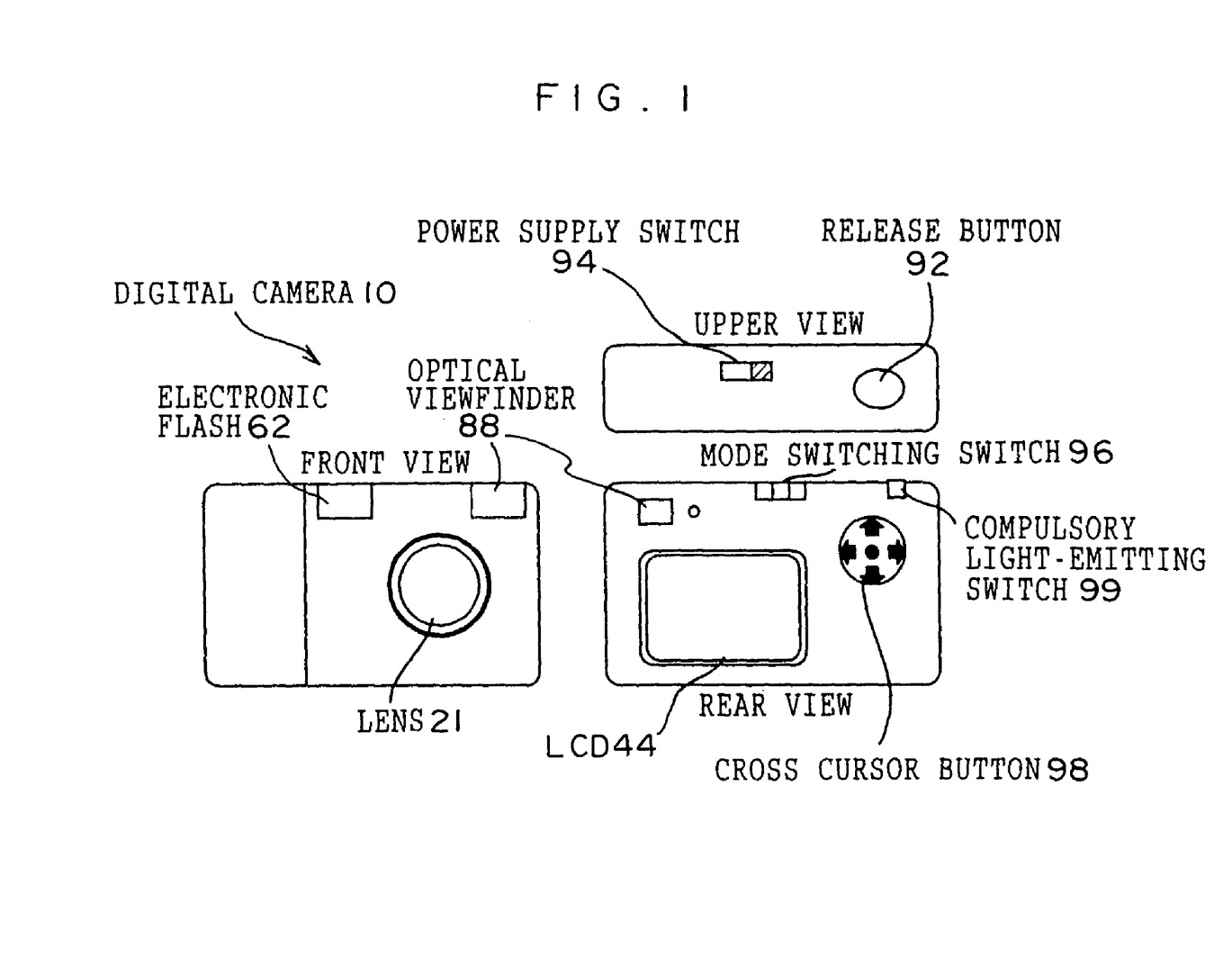
FIG. 1 is a schematic diagram showing an outward configuration of a digital camera according to an embodiment of the invention.

As shown in FIG. 1, in a front surface of the digital camera 10, the following are disposed: a lens 21 for image-forming an object image; an electronic flash 62 for emitting light, which is irradiated on an object as needed at a time of photographing; and an optical viewfinder 88 used to determine a picture composition of the object. A release button (so-called "shutter") 92 which is depress-operated by a user when photographing is to be executed and a power switch 94 are disposed on an upper surface of the digital camera 10.

The release button 92 of the digital camera 10 according to the embodiment is structured such that two stage depressing can be operated (two stage depressing operation), i.e., a state (referred to as a "half-depressed state" hereinafter), in which the button is depressed to an intermediate position, and a state (referred to as a "fully-depressed state" hereinafter), in which the button is depressed to a final depressed position. In the digital camera 10, when the release button 92 is set in the half-depressed state, an AE (Automatic Exposure) function operates to set exposure conditions (shutter speed and state of aperture). Thereafter, an AF (Auto Focus) function operates to perform focusing control. Thereafter, when the release button 92 is set to the fully-depressed state, exposure (photographing) is performed.

On a rear surface of the digital camera 10, an eyepiece of the optical viewfinder 88, a liquid crystal display (referred to as an "LCD" hereinafter) 44, a mode switching switch 96, a cross cursor button 98, and a compulsory light-emitting switch 99 are disposed.

On the LCD, a screen of an object image displayed by digital image data obtained by photographing, various menus, a message, or the like, is displayed. One of a photographing mode for performing photographing and a reproduction mode for displaying (reproducing) the object image expressed by the digital image data obtained by photographing on the LCD 44 is set by the user slidably operating the mode switching switch 96. The cross cursor button 98 is structured to include a total of five keys, four arrow keys indicating four moving directions, i.e., up, down, left, and right, in the display area of the LCD 44 and a determination key positioned at the center of the four arrow keys. When the compulsory light-emitting switch 99 is depress-operated by the user, a compulsory light-emitting mode is set. In subsequent photographing, the electronic flash 62 is operated to compulsory emit light.

A configuration of an electrical system of the digital camera 10 according to the present embodiment will be described below with reference to FIG. 2.

Figure 2:
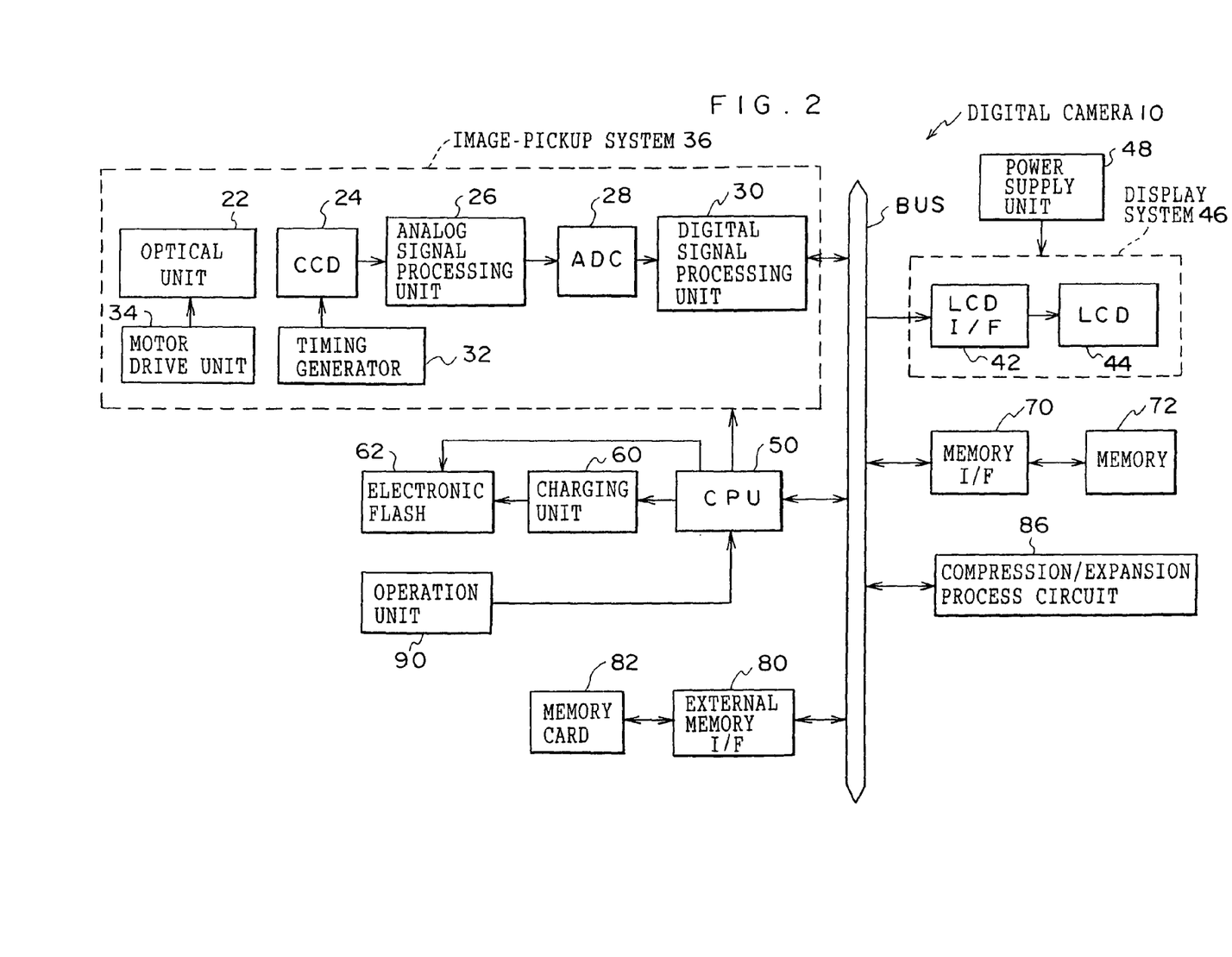
FIG. 2 is a block diagram showing a configuration of an electrical system of the digital camera according to the embodiment of the invention.

As shown in FIG. 2, the digital camera 10 comprises an image-pickup system 36 including: an optical unit 22 including the lens 21; a charge coupled device (referred to as a "CCD" hereinafter) 24 arranged behind the lens 21 along the optical axis thereof; an analog signal processing unit 26 including a correlated double sampling circuit (referred to as a "CDS" hereinafter); an analog/digital converter (referred to as an "ADC" hereinafter) 28 for converting an input analog signal into digital data; and a digital signal processing unit 30, which includes a line buffer having a predetermined capacity, controls direct storage of the digital image data in a predetermined area of a memory 72 (to be described later), and performs various digital image processings to the digital image data.

The correlated double sampling process performed by the CDS is a process which obtains correct pixel data by calculating a difference between a feedthrough component level included in an output signal of each pixel of a solid-state imaging device and a pixel signal component level in order to reduce noise (especially, thermal noise) included in an output signal of the solid-state imaging device.

The digital camera 10 comprises: an LCD interface 42 for generating a signal for displaying an image expressed by digital image data; the menu screen, or the like on the LCD 44 and supplying such signal to the LCD 44; a CPU (Central Processing Unit) 50 for controlling the entire operation of the digital camera 10; a memory 72 mainly constituted by an SDRAM (Synchronous DRAM) for storing digital image data obtained by photographing; a memory interface 70 for controlling access to the memory 72; an external memory interface 80 for enabling access to a memory card 82 constituted by a Smart Media (trade mark) through the digital camera 10; and a compression/expansion process circuit 86 for performing a compression process to digital image data using a predetermined compression format and performing an expansion process to the digital image data subjected to the compression process according to the compression format.

In the above configuration, the digital signal processing unit 30, the LCD interface 42, the CPU 50, the memory interface 70, the external memory interface 80, and the compression/expansion process circuit 86 are connected to each other through a system bus BUS. Therefore, the CPU 50 can control the operations of the digital signal processing unit 30, the compression/expansion process circuit 86, display various information on the LCD 44 through the LCD interface 42, and access the memory 72 and the memory card 82 through the memory interface 70 and the external memory interface 80.

The digital camera 10 comprises a timing generator 32 for generating a timing signal, which is mainly for driving the CCD 24, and supplying the timing signal to the CCD 24. The driving of the CCD 24 is controlled by the CPU 50 through the timing generator 32.

In addition, the digital camera 10 comprises a motor drive unit 34. The driving of a focus adjustment motor, a zoom motor, and an aperture drive motor, which are provided in the optical unit 22, are also controlled by the CPU 50 through the motor drive unit 34.

More specifically, the lens 21 included in the optical unit 22 according to this embodiment has a plurality of lenses, is constituted as a zoom lens which can change a focal length (change magnification), and comprises a lens drive mechanism (not shown). The lens drive mechanism includes the focus adjustment motor, the zoom motor, and the aperture drive motor. These motors are driven by controlling of the CPU 50 with a drive signal supplied from the motor drive unit 34.

When an optical zoom magnification is to be changed, the CPU 50 drives and controls the zoom motor to change a focal length of the lens 21 included in the optical unit 22.

The CPU 50 drives and controls the focus adjustment motor such that a contrast value of an image obtained by image pickup performed by the CCD 24 is maximized, thereby performing focusing control. More specifically, in the digital camera 10 according to the embodiment of the invention, as focusing control, a so-called "TTL (Through The Lens) system", which sets the position of a lens such that the contrast of a read image is maximized, is employed.

Furthermore, the various buttons and switches (in FIG. 2, these buttons and switches are generically called an "operation unit 90") such as the release button 92, the power switch 94, the mode switching switch 96, the cross cursor button 98, and the compulsory light-emitting switch 99 are connected to the CPU 50. The CPU 50 can always comprehend an operation state with respect to the operation unit 90.

In the digital camera 10 a charging unit 60 is interposed between the electronic flash 62 and the CPU 50. The charging unit 60 is for charging, by the control of the CPU 50, power which causes the electronic flash 62 to emit light.

Furthermore, the electronic flash 62 is also connected to the CPU 50, and the light emission of the electronic flash 62 is controlled by the CPU 50.

The digital camera 10 further comprises a power supply unit 48 for supplying power from a power supply to each unit of the digital camera 10. The power supply unit 48 supplies, by the control of the CPU 50, the power from the power supply to all devices to which the power of the power supply must be supplied. In FIG. 2, in order to avoid a complex illustration, only power supply lines to the display system 46 constituted by the power supply unit 48, the LCD interface 42, and the LCD 44, which especially relate to the invention are illustrated, and power supply lines to other devices are omitted.

The CCD 24 corresponds to the imaging device of the invention, the display system 46 corresponds to the display unit of the invention, the CPU 50 corresponds to the controller of the invention, and the optical viewfinder 88 corresponds to the optical viewfinder of the invention.

The operation of the digital camera 10 according to the present embodiment will be described below. First, the overall operation of the digital camera 10 in a photographing state will be briefly described below.

Image pickup is performed by the CCD 24 through the optical unit 22, and the CCD 24 sequentially outputs R (red), G (green), and B (blue) signals, which express an object image, to the analog signal processing unit 26. The analog signal processing unit 26 performs analog signal processing such as a correlated double sampling process to the signals input from the CCD 24, and then sequentially outputs the processed signals to the ADC 28. The ADC 28 converts the R, G, and B signals input from the analog signal processing unit 26 into 12-bit R, G, and B signals (digital image data) and sequentially outputs the 12-bit converted R, G, and B signals to the digital signal processing unit 30. The digital signal processing unit 30 accumulates the digital image data, which is sequentially input from the ADC 28, in the built-in line buffer and temporarily stores the digital image data in a predetermined area of the memory 72.

The digital image data stored in the predetermined area of the memory 72 are read by the digital signal processing unit 30 under the control of the CPU 50. Digital gain is applied to the digital image data depending on a predetermined physical quantity to perform white balance adjustment, and a gamma process and a sharpness process are performed on the digital image data to generate 8-bit digital image data. In addition, the digital image data are subjected to YC signal processing to generate a luminance signal Y and chroma signals Cr and Cb (referred to as "YC signals" hereinafter), and the YC signals are stored in an area different from the predetermined area on the memory 72.

The LCD 44 is structured to be able to be used as a viewfinder by displaying a video image (through image) obtained by continuous photographing by the CCD 24. When the LCD 44 is used as the viewfinder as described above, the generated YC signals are sequentially output to the LCD 44 through the LCD interface 42. As a result, the through image is displayed on the LCD 44.

In this case, when the release button 92 is half depressed by the user, the AE function operates as described above to set the exposure conditions (state), and the AF function operates to perform focusing control. Thereafter, when the release button 92 is continuously fully depressed, the YC signals stored in the memory 72 at this time are compressed in the predetermined compression format (JPEG format in the embodiment) by the compression/expansion process circuit 86. Thereafter, the signals are recorded on the memory card 82 through the external memory interface 80, thereby taking a photograph.

Figure 3:
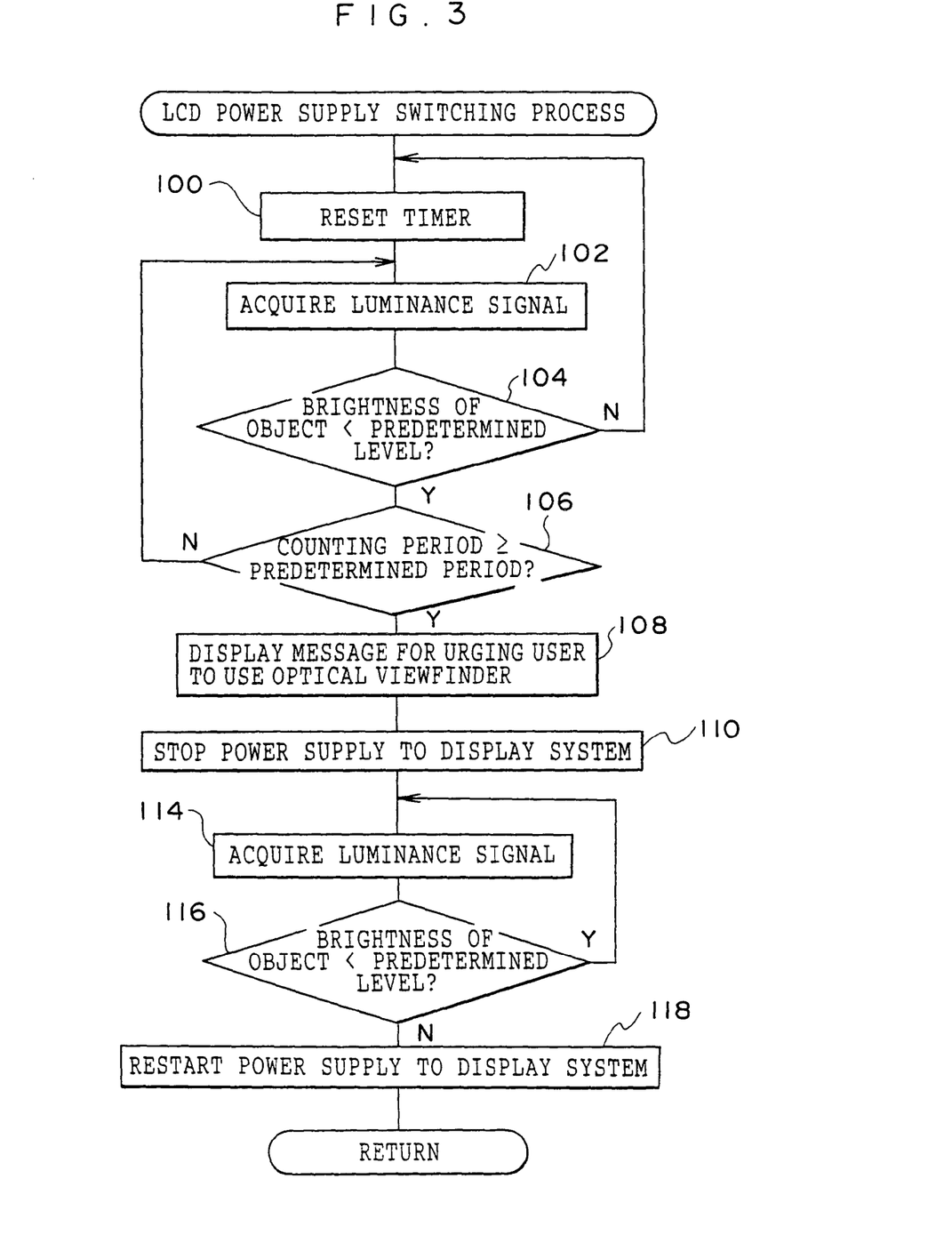
FIG. 3 is a flow chart showing a flow of a processing of an LCD power supply switching process executed by a CPU of the digital camera according to the embodiment of the invention.

In the digital camera 10 according to the present embodiment, when drive power is supplied from the power supply unit 48 to the display system 46 and the LCD 44 is used as the viewfinder, an LCD power supply switching process for controlling switching of power supply states of the drive power supplied from the power supply unit 48 to the display system 46 is executed. The LCD power supply switching process according to the present embodiment will be described below with reference to FIG. 3. FIG. 3 is a flow chart showing a flow of the processes of an LCD power supply switching process executed by the CPU 50 when the LCD power supply switching process is executed in the digital camera 10.

In step 100, a time of a timer (not shown) built in the CPU 50 is reset. In the next step 102, a most recent luminance signal Y stored in the memory 72 at this time is read as information expressing the brightness of the object image at this time. More specifically, the luminance signal Y corresponds to the brightness information of the invention. The process in step 102 functions as means of acquiring brightness information.

In step 104, it is determined whether the brightness of the object image expressed by the acquired luminance signal Y is lower than a predetermined level or not. If the determination in step 104 is affirmative, the object image is considered to be dark such that the state of the object image could not be easily checked even if the through image were displayed on the LCD 44, and the process proceeds to step 106. If the determination is negative in step 104, the brightness of the object image is considered to be sufficient to check the state of the object, and the process returns to step 100 without performing a subsequent process.

In the present embodiment, the average of luminance signals Y of one image (one frame) acquired in step 102 is applied as the brightness of the object image. However, the brightness is not limited to this average. For example, the average of the luminance signals Y of a partial area (for example, an area positioned at the center of the image) of the luminance signals Y of the one acquired image (one frame) can be applied. In the present embodiment, as the predetermined level (the level at which, in a case when the level of the brightness of the object image expressed by the luminance signal Y is lower than the predetermined level, the visibility of the object image displayed on the LCD 44 can be considered to not be a practical level), a level which is statistically determined by a sensory analysis performed by a plurality of persons, more specifically, a level at which it is determined by a majority of the persons that the visibility of the displayed object image has a practical problem, is applied.

In step 106, it is determined whether a counting period of the timer is equal to or longer than a predetermined period (5 seconds in the present embodiment) or not. If the determination in step 106 is negative, the process returns to step 102. If the determination in step 106 is affirmative, the process moves to step 108.

When a period, in which the level of the brightness of the object image expressed by the luminance signal Y obtained by image pickup performed by the CCD 24 is lower than the predetermined level, continues for a predetermined period or longer in steps 100 to step 106, the process proceeds to step 108.

Figure 4:
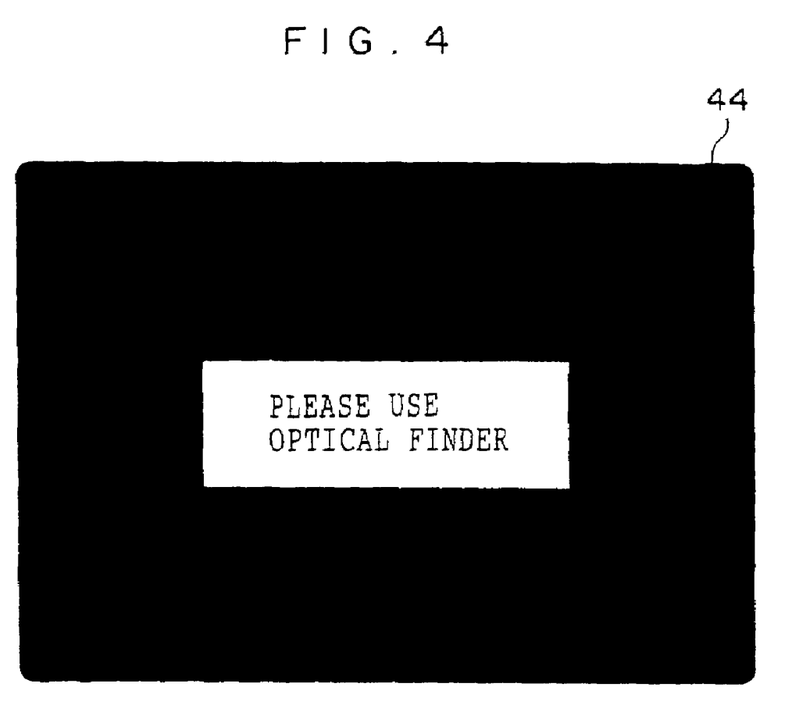
FIG. 4 is a schematic diagram showing an example of a message displayed on an LCD 44 during execution of the LCD power supply switching process according to the embodiment of the invention.

In step 108, a message for urging the user to use the optical viewfinder 88 is displayed on the LCD 44. FIG. 4 shows an example of the message ("Please use optical viewfinder") displayed on the LCD 44 by the process in this step 108. As this message, any message which urges the user to use the optical viewfinder 88 can be used. The message may be displayed to be superimposed on the through image on the display by an OSD ("On Screen Display") function, or just the message may be simply displayed. Since the user uses the LCD 44 as a viewfinder, the user will certainly see the message. The process in this step 108 functions as clearly indicating means.

In a next step 110, related units are controlled such that power supply from the power supply unit 48 to the display system 46 is stopped. In this manner, unnecessary power supply to the display system 46 can be stopped, and power consumption can be reduced. Although the display of the through image on the LCD 44 is stopped by the process in this step 110, the user will not be confused because the user understands use of the optical viewfinder by the process in step 108. The process in this step 110 functions as power supply stopping means.

In a next step 114, as in step 102, the most recent luminance signal Y stored in the memory 72 at this time is read as information expressing the brightness of the object image at this time. In a next step 116, as in step 104, it is determined whether the brightness of the object image expressed by the acquired luminance signal Y is lower than the predetermined level (the same level in the step 104) or not. If the determination in step 116 is affirmative, the object image is considered to be dark such that the state of the object image could not be easily checked even if the through image were displayed on the LCD 44, and the process returns to step 114. If the determination in step 116 is negative, the brightness of the object image is considered to have returned to a sufficient level for checking the state of the object by the LCD 44, and the process moves to step 118.

In step 118, the related units are controlled such that power supply of the drive power from the power supply unit 48 to the display system 46 is restarted. Thereafter, this LCD power supply switching process is ended. The display of the through image on the LCD 44 is restarted by the process in step 118. The process in the step 118 functions as supply restarting means.

As described above, in the digital camera 10 according to this embodiment, drive power is supplied to the display system 46, and the supply of the drive power to the display system 46 is stopped when the period, in which the brightness of an object image is lower than the predetermined level, continues for a predetermined period or longer. For this reason, unnecessary power consumption can be prevented from occurring in the display system 46. As a result, the power consumption can be reduced.

In the digital camera 10 according to the present embodiment, after the supply of drive power to the display system 46 is stopped, when the brightness expressed by the luminance signal Y is equal to or higher than the predetermined level, the supply of the drive power to the display system 46 is restarted. For this reason, the display system 46 can be effectively used.

Furthermore, in the digital camera 10 according to the present embodiment, the optical viewfinder 88, through which the object image can be visually checked, is further provided, and it is clearly indicated that the user is being urged to use the optical viewfinder 88 when the supply of a drive power to the display system 46 is stopped. For this reason, even if the supply of the drive power to the display system 46 is stopped to stop the display of the object image by the display system 46, the user can visually check the object image through the optical viewfinder 88 without being confused. In particular, in this embodiment, the message for urging the user to use the optical viewfinder 88 is displayed by the LCD 44 to clearly indicate that the user is being urged to use the optical viewfinder 88. For this reason, this configuration is especially effective in this embodiment in which the LCD 44 is used as the viewfinder.

In the present embodiment, as the clear indication performed by the clearly indicating means, the clear indication achieved by displaying a message on the LCD 44 is used. However, the clear indication of the invention is not limited to the clear indication of the present embodiment. Sounding a buzzer, generating voice guidance by a voice generator, turning on or flickering an LED, or the like can also be used as the clear indication. In these cases, the same effect as in the present embodiment can be obtained.

The present embodiment describes the case in which the brightness information expressing the brightness of the object image is obtained by using the luminance signal Y obtained by photographing performed by the CCD 24, which has been conventionally installed in the digital camera 10. However, the invention is not limited to this case and may employ a configuration in which a photometric sensor such as a photodiode or a phototransistor is provided to obtain the brightness information.

Furthermore, in the digital camera 10 according to the present embodiment, the supply of the drive power to the display system 46 is stopped when a state in which the brightness of the object image is lower than the predetermined level continues for the predetermined period. However, it is acceptable, for example, to only stop the supply of the drive power to the LCD 44.

In the present embodiment, after the supply of the drive power to the display system 46 is stopped, when the brightness of the object returns to the predetermined level or higher, the supply of the drive power to the display system 46 is restarted. However, it is acceptable to restart the supply of the drive power to the display system 46 when the brightness of the object image has returned to the predetermined level or higher and the period, in which the brightness is equal to or higher than the predetermined level, continues for the predetermined period. In this case, the power supply to the display system 46 can be prevented from being stopped again by a temporary return to the brightness of the object image.

As has been described above in detail, according to the digital camera of the invention, when the drive power is supplied to the display unit, and when the period, in which the brightness of an object image is lower than the predetermined level, continues for the predetermined period or longer, the supply of the drive power to the display unit is stopped. For this reason, the unnecessary power consumption in the display unit can be prevented. As a result, the present invention obtains the effect of being able to reduce power consumption.

What is claimed is:

1. A digital camera comprising:
    an imaging device for generating image data, which expresses an object image, by picking up an image of an object;
    a display unit for displaying the object image, wherein the display unit is driven by power being supplied such that the object image can be displayed based on the image data; and
    a controller for controlling the supply of power to the display unit based on a brightness of the object at a timing of photographing, wherein information expressing the brightness of the object is generated, and the controller controls such that the supply of power to the display unit is stopped when a period, in which a brightness expressed by the information is less than a predetermined value, continues for at least a predetermined period.

2. A digital camera according to claim 1, wherein information expressing the brightness of the object is a luminance signals in the image data.

3. A digital camera according to claim 1, wherein the information expressing the brightness of the object is an average of luminance signal in the image data corresponding to one frame.

4. A digital camera according to claim 1, wherein the information expressing the brightness of the object is an average of luminance signals in the image data in a partial area of an image, which corresponds to one frame.

5. A digital camera according to claim 1, further comprising a sensor for measuring the brightness of the object, wherein the information expressing the brightness of the object is provided by the sensor.

6. A digital camera according to claim 1, wherein after the controller stops the power supply to the display unit, when the information expressing the brightness returns to a value, which is not less than the predetermined value, the controller restarts the power supply to the display unit.

7. A digital camera according to claim 1, wherein after the controller stops the power supply to the display unit, when the information expressing the brightness has returned to a value, which is not less than the predetermined value, and and when the period,in which the brightness is no less than the predetermined value, continues for at least another predetermined period, the controller restart the power supply to the display unit.

8. A digital camera according to claim 1, further comprising an optical viewfinder through which an object can be visually checked, wherein, when power supply to the display unit has been stopped to stop the display of the object image, guidance for use of the optical finder is provided by an indication means.

9. A digital camera according to claim 8, wherein the guidance is constituted by a message displayed on the display unit.

10. A digital camera according to claim 8, further comprising a voice generator, wherein the guidance includes voice generated by the voice generator.

11. A digital camera according to claim 1, wherein the supply of power to the display unit is stopped automatically, based on an operation of the controller.

12. A power supply control method for use with a digital camera, which includes a display unit and can display on the display unit an image of an object to be picked up by supplying power to the display unit, the method comprising the steps of:

determining a brightness of the object at a time of photographing;

controlling power supply to the display unit based on a result of the determination, to reduce power consumption in the display unit; and generating information expressing the brightness of the object, wherein the step of controlling power supply controls such that the power supply to the display unit is stopped when a period, in which a brightness expressed by the information is less than a predetermined value, continues for at least a predetermined period.

13. A power supply control method for use with a digital camera according to claim 12, wherein the step of controlling the power supply further comprises the sub steps of: monitoring the information expressing the brightness after the power supply to the display unit is stopped; and restarting the power supply to the display unit when the information expressing the brightness returns to a value, which is not less than the predetermined value.

14. A power supply control method for use with a digital camera according to claim 12, wherein the step of controlling the power supply further comprises the sub steps of: monitoring the information expressing the brightness after the power supply to the display unit is stopped; and restarting the power supply to the display unit when the information expressing the brightness has returned to a value, which is not less than the predetermined value, and the period, in which the information is not less than the predetermined value, continues for another predetermined period.

15. A power supply control method for use with a digital camera according to claim 12, wherein the step of controlling power supply such that the power supply to the display unit is stopped is automatic.

* * * * *